(12) United States Patent
Sakamoto (10) Patent No.: US 10,263,354 B2
(45) Date of Patent: *Apr. 16, 2019

(54) ELECTRONIC COMPONENT AND IMAGING DEVICE

(71) Applicant: IRISO ELECTRONICS CO., LTD., Kanagawa (JP)

(72) Inventor: Tetsuma Sakamoto, Kanagawa (JP)

(73) Assignee: IRISO ELECTRONICS CO., LTD., Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/822,566

(22) Filed: Nov. 27, 2017

(65) Prior Publication Data

US 2018/0159257 A1 Jun. 7, 2018

(30) Foreign Application Priority Data

Dec. 1, 2016 (JP) .................................. 2016-234501

(51) Int. Cl.

| | |
|---|---|
| *H01R 13/11* | (2006.01) |
| *H01R 13/04* | (2006.01) |
| *H01R 33/96* | (2006.01) |
| *G03B 17/02* | (2006.01) |
| *H01R 12/70* | (2011.01) |
| *H01R 12/72* | (2011.01) |
| *H01R 13/66* | (2006.01) |
| *H01R 13/52* | (2006.01) |

(Continued)

(52) U.S. Cl.
CPC .......... *H01R 13/113* (2013.01); *G03B 17/02* (2013.01); *H01R 12/7076* (2013.01); *H01R 12/725* (2013.01); *H01R 13/04* (2013.01);

*H01R 33/96* (2013.01); *H01R 12/716* (2013.01); *H01R 13/5213* (2013.01); *H01R 13/6658* (2013.01); *H01R 31/06* (2013.01)

(58) Field of Classification Search
CPC .............. H01R 12/716; H01R 13/6658; H01R 13/5213

See application file for complete search history.

(56) References Cited

U.S. PATENT DOCUMENTS 5,096,427 A * 3/1992 Sadigh-Behzadi ........................
H01R 12/7082
361/759
6,155,856 A * 12/2000 Sanada ................. B60T 8/3675
439/246

(Continued)

FOREIGN PATENT DOCUMENTS

JP 2008-170801 A 7/2008

*Primary Examiner* — Tho D Ta
(74) *Attorney, Agent, or Firm* — Cermak Nakajima & McGowan LLP; Tomoko Nakajima (57) ABSTRACT

In an imaging device, an electric connection is achieved in which a pressing force of a terminal of a substrate-side connector does not act on a substrate stored in a housing. Harness connection terminals have plate-shaped contact pieces projecting from an inner peripheral surface of a cylindrical peripheral wall of a rear housing. Terminals of a connector have clamp contact portions that clamp the plate-shaped contact pieces to be in conductive contact therewith. The pressing force of the clamp contact portions acts in the plate thickness direction of the plate-shaped contact pieces, but does not act in the plate thickness direction of the substrate. This avoids warpage of the substrate.

6 Claims, 9 Drawing Sheets

(51) Int. Cl.
*H01R 12/71* (2011.01)
*H01R 31/06* (2006.01)

(56) References Cited

U.S. PATENT DOCUMENTS

| | | | | |
|---|---|---|---|---|
| 6,428,332 | B1* | 8/2002 | Nakamura | H01R 12/712 |
| | | | | 439/733.1 |
| 6,551,144 | B2* | 4/2003 | Wellmann | H01R 9/031 |
| | | | | 439/404 |
| 8,608,489 | B2* | 12/2013 | Nogami | H01R 13/6658 |
| | | | | 439/377 |
| 8,721,351 | B2* | 5/2014 | Nitta | G01B 7/003 |
| | | | | 439/76.1 |

\* cited by examiner

ELECTRONIC COMPONENT AND IMAGING DEVICE

BACKGROUND OF THE INVENTION

1. Field of the Invention

The present invention relates to an electronic component, and more particularly, to an electronic component for an imaging device, such as an on-vehicle camera, and an imaging device including the electronic component.

2. Description of the Related Art

There are used small imaging devices each including an image pickup element, such as a vehicle drive recorder, an on-vehicle camera used to improve visibility on the rear side of the vehicle, and a monitoring camera used for crime prevention in a bank and a store. For example, Japanese Unexamined Patent Application Publication No. 2008-170801 (FIG. 1) (PTL 1) describes an example of such a conventional imaging device.

This imaging device includes a box-shaped housing having a front housing and a rear housing. Inside the housing, a substrate having an image pickup element mounted on one surface thereof is stored. On the other surface of the substrate, a substrate-side connector is mounted. In the rear housing, contact portions of harness connection terminals are disposed at positions opposed to terminals of the substrate-side connector. When the front housing and the rear housing are combined, the contact portions are brought into press contact with the terminals of the substrate-side connector and are conductively connected thereto. At the other ends of the harness connection terminals, other contact portions are provided to be conductively connected to a harness (wire cable) serving as an external conductor. Imaging signals generated in the imaging device are transmitted to an external apparatus through the harness.

When the contact portions of the harness connection terminals are in press contact with the terminals of the substrate-side connector as in this conventional imaging device, the spring force (reactive force) of the terminals of the substrate-side connector, which receive the pressing force of the contact portions of the harness connection terminals, continuously acts on the substrate on which the substrate-side connector is mounted, and this may warp the substrate. If the substrate is warped, the focal position of the image pickup element may be displaced, and a soldered portion of an electronic component mounted on the substrate may be cracked. In particular, smaller and lighter imaging devices have been developed, and imaging devices including a substrate having a thickness of less than 1 mm have been gradually used. Therefore, the substrate is easily warped by a smaller pressing force owing to such thickness reduction. Hence, it is preferable to minimize the spring force the substrate receives from the mounted substrate-side connector.

SUMMARY OF THE INVENTION

The present invention has been made in the context of the related art described above, and an object of the invention is to achieve such an electric connection that the spring force of terminals of a substrate-side connector mounted on a substrate in an imaging device does not act on the substrate.

To achieve the above object, the present invention has the following features.

The present invention provides an electronic component for an imaging device, including a housing and a terminal fixed to the housing. The housing includes an external-conductor connecting portion to which an external conductor is fitted and connected, a cylindrical peripheral wall that receives a substrate with a connector mounted thereon, and a partition that separates the external-conductor connecting portion and an inside of the cylindrical peripheral wall. The terminal has an outer contact portion disposed in the external-conductor connecting portion to be in conductive contact with the external conductor. The terminal includes an inner contact portion projecting from an inner peripheral surface of the cylindrical peripheral wall to be in conductive contact with a connector terminal of the connector, and a relay portion embedded in the partition and extending to connect the outer contact portion and the inner contact portion.

According to the present invention, the terminal (harness connection terminal) has the inner contact portion projecting from the inner peripheral surface of the cylindrical peripheral wall to be in conductive contact with the connector terminal of the connector (substrate-side connector). Hence, the terminal is not in elastic contact with the connector terminal in the axial direction of the cylindrical peripheral wall. That is, since the inner contact portion of the terminal projects from the inner peripheral surface of the cylindrical peripheral wall, the spring force of the connector terminal can be prevented from acting on the substrate in the plate thickness direction of the substrate. Further, according to the present invention, the relay portion is embedded in the partition and extends to connect the outer contact portion and the inner contact portion. Hence, it is possible to minimize the space where the relay portion extending from the outer contact portion to the inner peripheral surface of the cylindrical peripheral wall is disposed. Such a relay portion may be completely embedded in the partition or may be partly embedded therein. With any of these structures, the relay portion can reduce the occupied space in the inner space of the cylindrical peripheral wall, and this contributes to space saving inside the housing and size reduction of the housing.

The inner contact portion can have such a length as to protrude from the partition wall through a plate thickness of the substrate. According to this, to align the optical axis of an image pickup element (adjust the focal position), the degree of flexibility in adjusting the mounting position of the substrate along the length direction of the inner contact portion can be increased. When the connector is mounted on the surface of the substrate opposed to the partition, a useless dead space is sometimes formed around the connector. According to the present invention, however, since the inner contact portion protrudes to the opposite surface opposite from the opposed surface through the plate thickness of the substrate, the connector can be mounted on the opposite surface. Therefore, the substrate can be disposed as close as possible to the partition. This contributes to space saving inside the housing and size reduction of the housing.

The relay portion can be formed as a flat conductive piece made of a flat metal piece. Since the relay portion is the flat conductive piece, the partition can be made thinner than when the relay portion has a circular cross section like a pin terminal or an electric wire. This contributes to size reduction of the housing.

The inner contact portion can be formed as a plate-shaped contact piece having a plate surface projecting from the inner peripheral surface. When the inner contact portion is formed as the plate-shaped contact piece having the plate surface projecting from the inner peripheral surface, a terminal structure can be achieved in which the connector terminal of the connector is in contact with the plate surface of the plate-shaped contact piece. This can prevent the spring force of the connector terminal from acting in the plate thickness direction of the substrate.

In the electronic component including the connector according to the present invention, the connector terminal has a clamp contact portion that clamps the inner contact portion in a plate thickness direction. According to this electronic component, since the connector terminal has the clamp contact portion that clamps the inner contact portion in the plate thickness direction, the spring force of the connector terminal can be prevented from acting in the plate thickness direction of the substrate, but the inner contact portion of the terminal and the connector terminal can be reliably brought into conductive contact with each other. Further, in the electronic component, the inner contact portion can be the plate-shaped contact piece.

The present invention further provides an imaging device including the electronic component according to any of the above-described electronic components. According to this, the spring force of the connector terminal does not act on a substrate provided in the imaging device in a plate thickness direction of the substrate. Hence, it is possible to achieve thickness reduction of the substrate provided in the imaging device, space saving of the inner space of the housing, and size reduction of the entire imaging device.

According to the present invention, since the spring force of the connector terminal does not act on the substrate in the imaging device in the plate thickness direction of the substrate, the imaging device can have high quality without any trouble, for example, without warping the substrate and cracking a soldered portion on the substrate. Further, since the total size of the imaging device can be reduced, the usage of the imaging device can be expanded.

DESCRIPTION OF THE PREFERRED EMBODIMENTS

Figure 1:
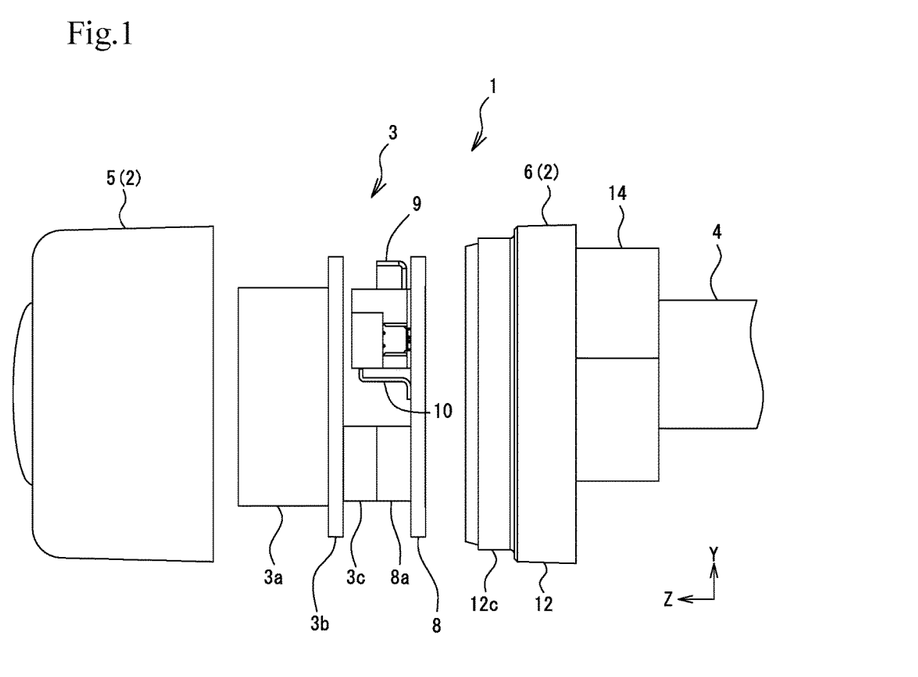
FIG. 1 is an exploded view of an imaging device according to a first embodiment.

An embodiment of the present invention will be descried below with reference to the drawings. In this description, the claims, and the drawings, an arrangement direction of terminals in a connector mounted on a substrate illustrated in FIG. 1 is taken as an X-direction (right-left direction), a depth direction of the connector is taken as a Y-direction (front-rear direction), and an optical axis direction of an image pickup element provided in an imaging device (height direction of the imaging device) is taken as a Z-direction (up-down direction). However, these definitions of the right-left, front-rear, and up-down directions do not limit the mount direction and use direction of the imaging device and so on in the present invention.

FIG. 1 illustrates an outline of an imaging device 1. The imaging device 1 includes a housing 2 formed by a resin body molded from hard resin, an imaging component 3, and a harness component 4. These components that constitute the imaging device 1 constitute "electronic component" in the present invention.

Figure 3:
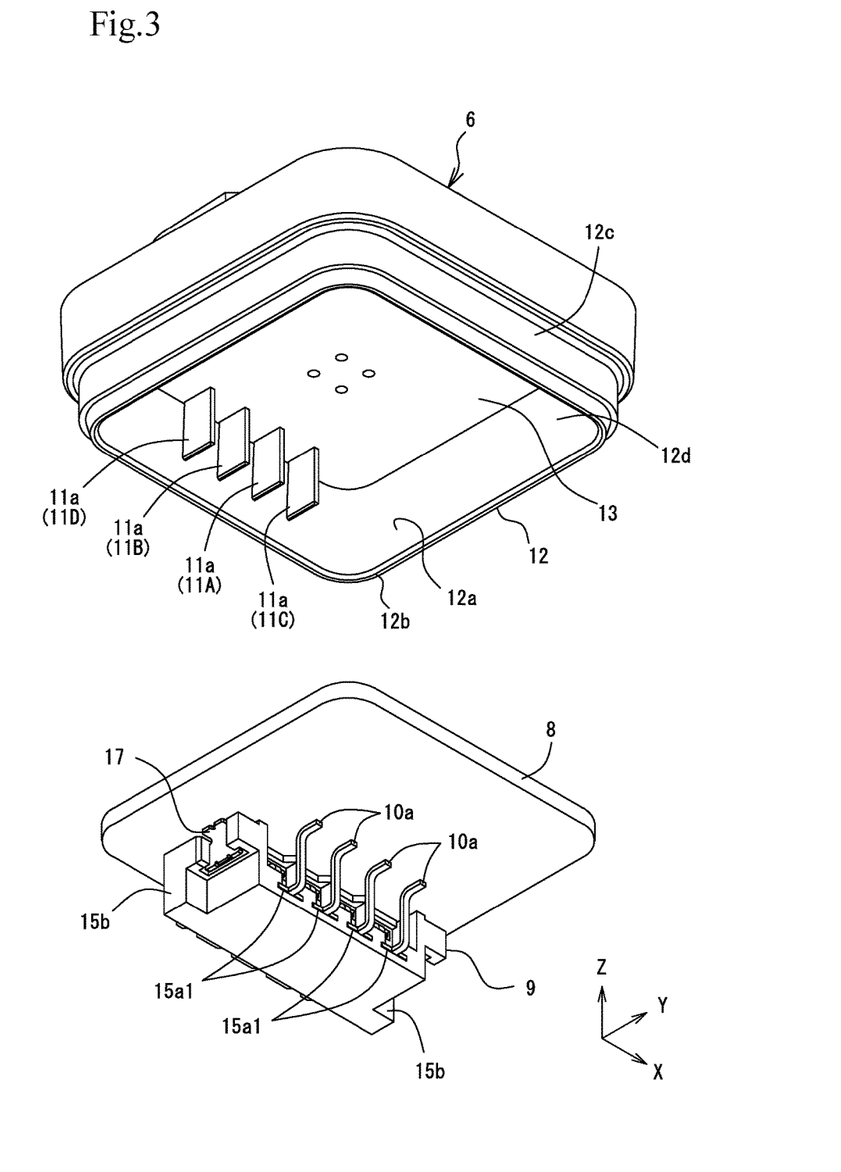
FIG. 3 is an assembly explanation view of the rear housing and a substrate in FIG. 1.

The housing 2 includes a front housing 5 and a rear housing 6. The imaging component 3 is stored in an inner space of the housing 2. The imaging component 3 of the embodiment includes an image pickup element 3a, a base 3b on which the image pickup element 3a is mounted, a substrate 8, and a connector 9 mounted on the substrate 8. On the base 3b and the substrate 8, unillustrated circuit lines and elements for a signal processing system are mounted, and are conductively connected by inter-substrate connectors 3c and 8a. The connector 9 includes a plurality of terminals 10 serving as "connector terminal", and the terminals 10 are in conductive contact with harness connection terminals 11A, 11B, 11C, and 11D fixed as "terminal" to the rear housing 6 (see FIG. 3). The harness component 4 serving as "external conductor" is connected to an unillustrated external apparatus. The imaging device 1 having the above-described general configuration is characterized in the rear housing 6, the harness connection terminals 11A to 11D, and the imaging component 3. Accordingly, these components will be described in more detail.

Rear Housing 6

Figure 2:
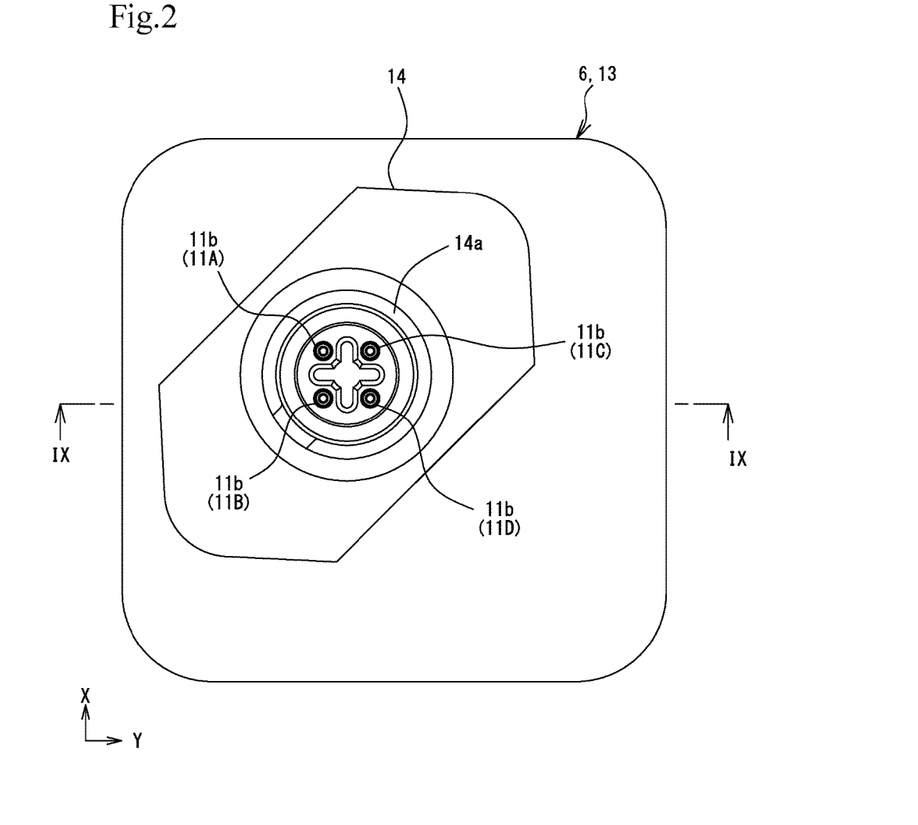
FIG. 2 is an explanatory view of a rear housing in FIG. 1.

The rear housing 6 includes a cylindrical peripheral wall 12, a partition 13 that closes one end of the cylindrical peripheral wall 12, and an external-conductor connecting portion 14 projecting from the partition 13.

The cylindrical peripheral wall 12 is shaped like a rectangular cylinder, and an inner space 12a for receiving the substrate 8 and the connector 9 is provided inside the cylindrical peripheral wall 12. The height of the inner space 12a of the rear housing 6 in the Z-direction (height of the cylindrical peripheral wall 12 from the partition 13) is set small to such an extent that the connector 9 does not protrude from an open end 12b of the cylindrical peripheral wall 12 in a state in which the substrate 8 and the connector 9 are received in the inner space 12a. A fitting portion 12c for the front housing 5 is provided on an outer peripheral surface of the cylindrical peripheral wall 12, and the front housing 5 is fitted on the fitting portion 12c, so that the imaging device 1 is assembled. One surface of inner surfaces 12d of the cylindrical peripheral wall 12 has a plurality of plate-shaped contact pieces 11a serving as "inner contact portion" provided at one end of each of the harness connection terminals 11A to 11D.

The partition 13 is provided to close one end of the cylindrical peripheral wall 12. In this partition 13, the harness connection terminals 11A to 11D are partly embedded, as will be described later. The external-conductor connecting portion 14 protrudes from an outer surface of the partition 13 that forms an outer surface of the rear housing 6. The external-conductor connecting portion 14 has a fitting recess 14a, and a plurality of pin-shaped contact portions 11b serving as "outer contact portion" of the harness connection terminals 11A to 11D project in the fitting recess 14a. When the harness component 4 is fitted in the fitting recess 14a, the pin-shaped contact portions 11b and the harness component 4 are conductively connected to each other.

Harness Connection Terminals 11A to 11D

The harness connection terminals 11A to 11D are provided as separate terminals. The pin-shaped contact portions 11b of the harness connection terminals 11A to 11D are each shaped like a cylindrical contact piece, and are inserted in and conductively connected to unillustrated socket terminals of the harness component 4.

Figure 4:
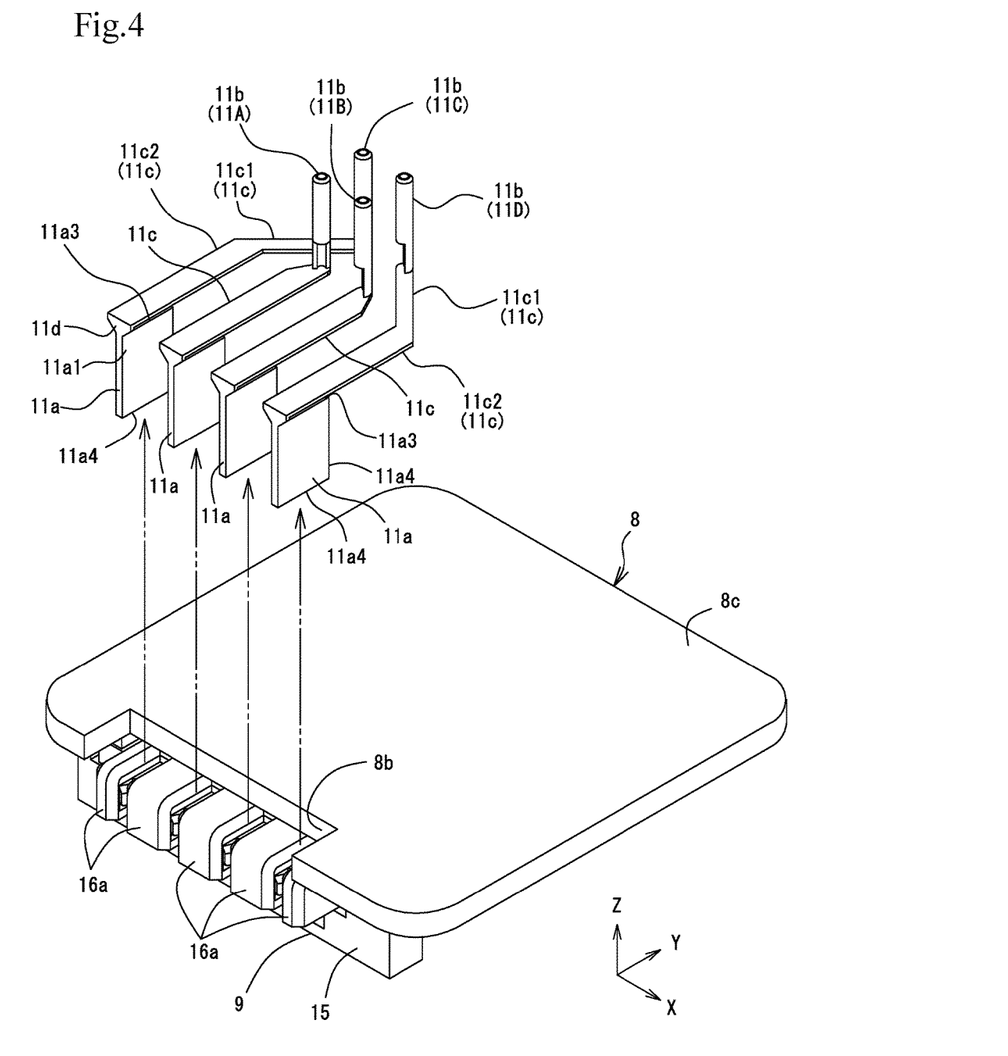
FIG. 4 is an explanatory view illustrating connection between harness connection terminals and a connector in FIG. 3.

In the harness connection terminals 11A to 11D, the projecting positions of the pin-shaped contact portions 11b in the fitting recess 14a of the partition 13 are different from the projecting positions of the plate-shaped contact pieces 11a on the inner peripheral surface 12d of the cylindrical peripheral wall 12, and relay portions 11c are provided to connect the plate-shaped contact pieces 11a and the pin-shaped contact portions 11b. As illustrated in FIG. 4, the relay portions 11c of the harness connection terminals 11A and 11B are linearly shaped while the pin-shaped contact portions 11b are located on the side of the cylindrical peripheral wall 12. The relay portions 11c of the harness connection terminals 11C and 11D extend toward the cylindrical peripheral wall 12 while taking a detour around the harness connection terminals 11A and 11B, and therefore, are bent to connect oblique linear portions 11c1 for taking a detour around the harness connection terminals 11A and 11B and linear portions 11c2 parallel to the harness connection terminals 11A and 11B. The relay portions 11c are each formed as a flat conductive piece made of a flat metal piece whose plate width is more than the plate thickness, and are completely embedded in the partition 13 by insert molding so as not to be exposed from the surface of the partition 13. Therefore, compared with the case in which the relay portions 11c are formed by pin terminals shaped like round bars or rectangular bars, or electric wires of circular cross section, the thickness of the partition 13 can be decreased, and the size of the rear housing 6 can be reduced.

In end portions of the relay portions 11c on the side of the cylindrical peripheral wall 12, bent portions 11d are provided to be bent in the height direction (length direction) of the cylindrical peripheral wall 12 (FIG. 4). At distal ends of the bent portions 11d, the above-described plate-shaped contact pieces 11a are provided. The plate-shaped contact pieces 11a of the harness connection terminals 11A to 11D project toward the inner space 12a of the cylindrical peripheral wall 12 so that the plate surfaces thereof intersect the inner peripheral surface 12d of the cylindrical peripheral wall 12. The plate-shaped contact pieces 11a are rectangular, and have respective connecting corner portions 11a1 connected to the bent portions 11d. Such plate-shaped contact pieces 11a can be formed by, for example, folding flat metal pieces in a double-folded manner. The plate-shaped contact pieces 11a have embedded edges 11a2 embedded in the cylindrical peripheral wall 12 (see FIG. 9), and are firmly held in the cylindrical peripheral wall 12 here. The plate-shaped contact pieces 11a have respective bottom edges 11a3 opposed to the relay portions 11c, and the bottom edges 11a3 are disposed in contact with the partition 13. For this reason, when connected to the connector 9, the bottom edges 11a3 can receive the inserting force from the terminals 10 by contact with the partition 13, and the action of the inserting force on the embedded edges 11a2 can be distributed. At two side edges of each of the plate-shaped contact pieces 11a facing the inner space 12a of the cylindrical peripheral wall 12, insertion edges 11a4 are provided to be inserted in the connector 9.

Connector 9

Figure 5:
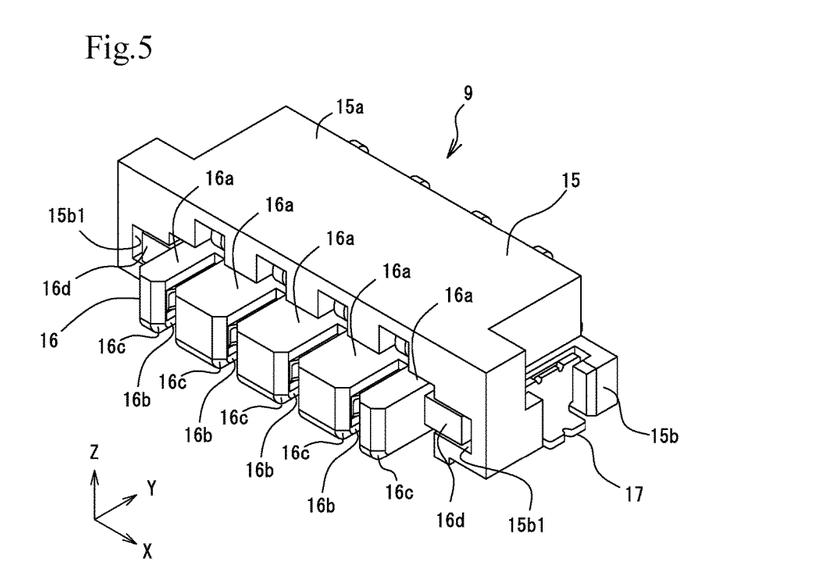
FIG. 5 is an external perspective view of the connector in FIG. 1.
Figure 6:
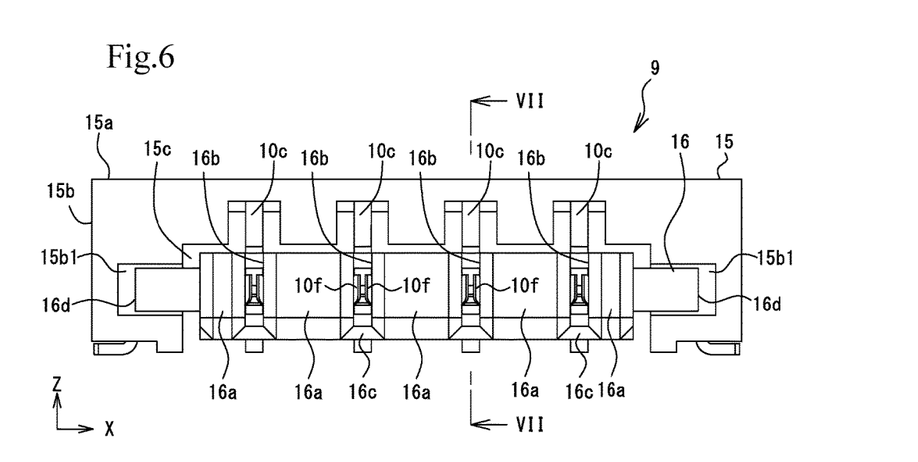
FIG. 6 is a front view of the connector in FIG. 5.
Figure 7:
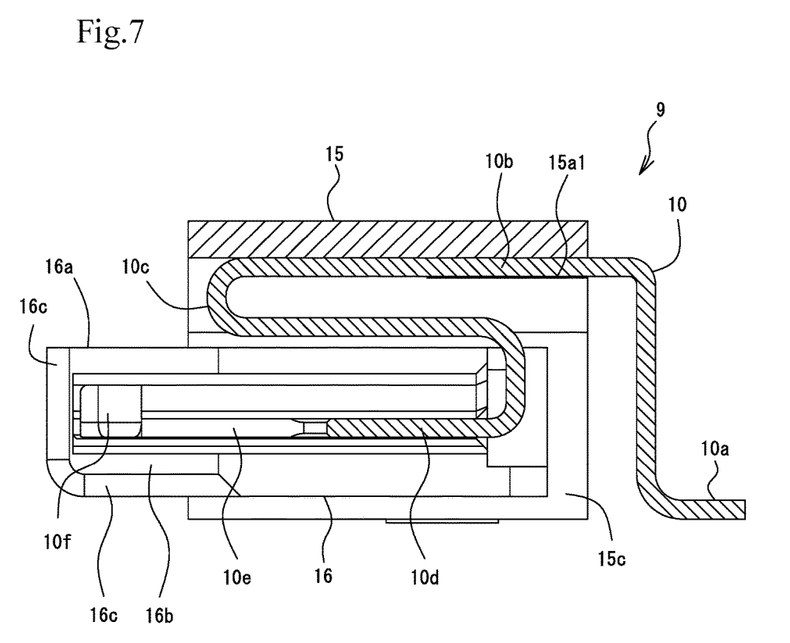
FIG. 7 is a cross-sectional view taken along line VII-VII in FIG. 6.

The connector 9 conductively connected to the harness connection terminals 11A to 11D includes a plurality of terminals 10 serving as "connector terminal", a fixed housing 15 made of hard resin, and a movable housing 16, and is structured as a floating connector in which the movable housing 16 is displaceable in the X-, Y-, and Z directions.

The fixed housing 15 has an upper wall 15a and left and right side walls 15b, and a receiving portion 15c for the movable housing 16 is provided in an inner space surrounded by these walls. The upper wall 15a has hole-shaped terminal fixing portions 15a1 in which the terminals 10 are to be press-fitted (see FIG. 3). To the side walls 15b, metal fixtures 17 to be soldered to the substrate 8 are attached. In inner surfaces of the side walls 15b, recesses 15b1 are provided to restrict the displacement of the movable housing 16, and displacement restricting portions 16d of the movable housing 16, which will be described later, are disposed inside the recesses 15b1.

The movable housing 16 has unillustrated hole-shaped terminal fixing portions in which the terminals 10 are to be press-fitted. The movable housing 16 has comb-shaped projecting portions 16a. The substrate 8 has such a recess 8b that the comb-shaped projecting portions 16a and the substrate 8 do not overlap with each other. Between the adjacent projecting portions 16a, terminal connecting grooves 16b penetrate in the Z-direction in which the plate-shaped contact pieces 11a of the harness connection terminals 11A to 11D are inserted. Distal ends of the projecting portions 16a adjacent to the terminal connecting grooves 16b can guide introduction of the plate-shaped contact pieces 11a in the terminal connecting grooves 16b by introducing portions 16c with corner portions chamfered.

Projection-shaped displacement restricting portions 16d are provided on the right and left side surfaces of the movable housing 16. The displacement restricting portions 16d are disposed in the recesses 15b1 of the above-described fixed housing 15, and the movable housing 16 can be displaced in the X-, Y-, and Z-directions until the displacement restricting portions 16d come into contact with the recesses 15b1.

Figure 8:
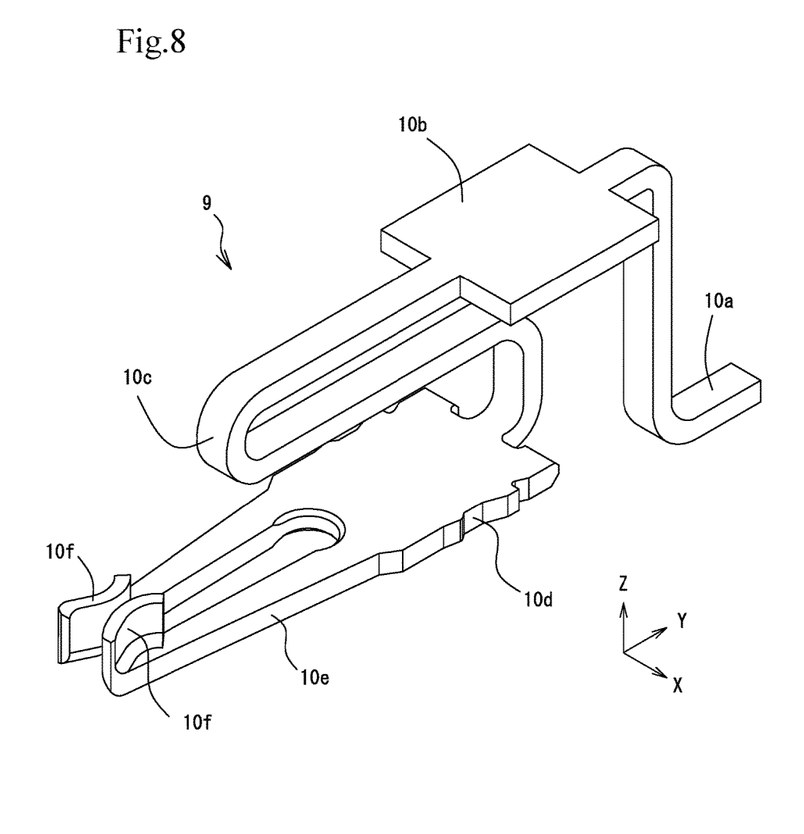
FIG. 8 is an external perspective view of a terminal of the connector in FIG. 5.

The terminals 10 respectively include substrate connected portions 10a to be soldered to the substrate 8, fixed-housing fixing portions 10b to be press-fitted and held in the terminal fixing portions 15a of the fixed housing 15, movable pieces 10c bent in an S-shape, movable-housing fixing portions 10d to be press-fitted and held in terminal fixing portions (not illustrated) of the movable housing 16, and clamp contact portions 10e that clamp the plate-shaped contact pieces 11a in conductive contact therewith. Therefore, the terminals 10 are fixed to the fixed housing 15 at the fixed-housing fixing portions 10b on one side of each of the movable pieces 10c, and are fixed to the movable housing 16 at the movable-housing fixing portions 10d on the other side of each of the movable pieces 10c. The terminals 10 elastically support the movable housing 16 so that the movable housing 16 can be displaced in the X-, Y-, and Z-directions by the movement of the movable pieces 10c in the X-, Y-, and Z-directions.

The clamp contact portions 10e are provided as fork-shaped springs, and are in press contact with the plate-shaped contact pieces 11a in the plate thickness direction by spring elasticity thereof. At a distal end of each of the clamp contact portions 10e, a pair of curved contact portions 10f formed by rolled faces are provided to allow the corresponding plate-shaped contact piece 11a to be smoothly inserted therebetween.

Conductive Connection of Harness Connection Terminals 11A to 11D and Connector 9

Figure 9:
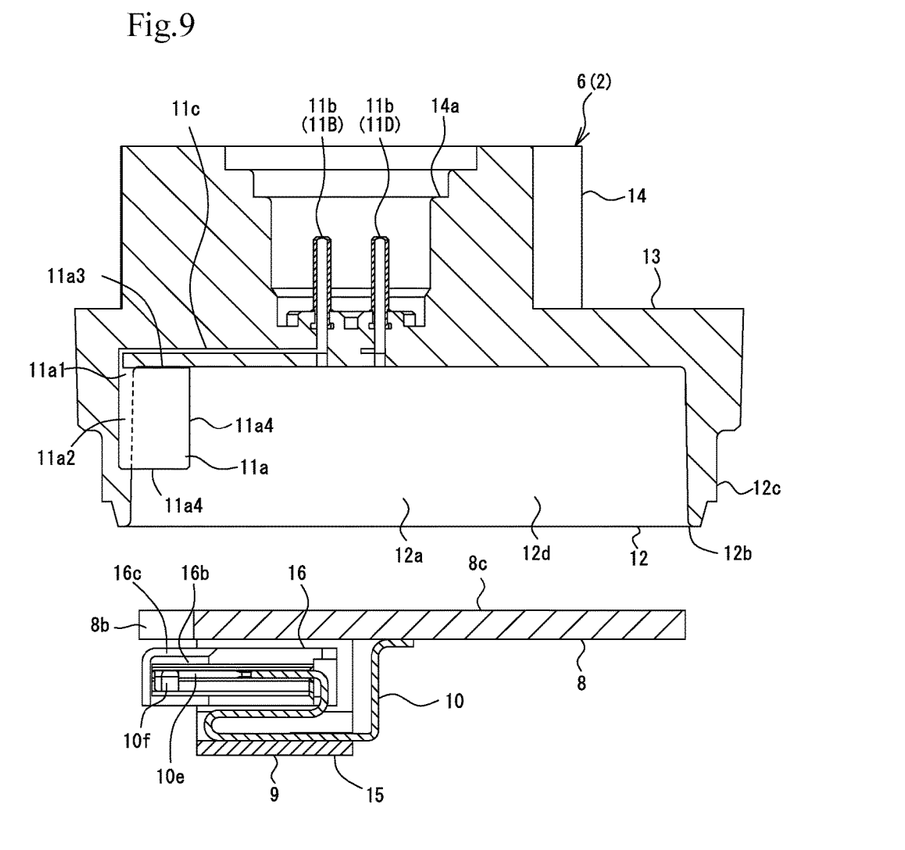
FIG. 9 is a cross-sectional view taken along line IX-IX in FIG. 2 and illustrates a state before the substrate is set in the rear housing.
Figure 10:
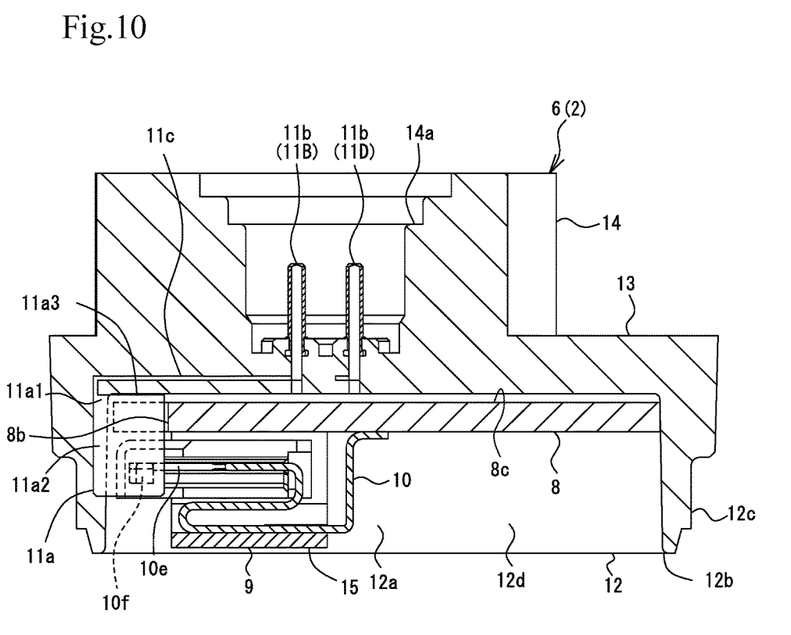
FIG. 10 is a cross-sectional view illustrating a state in which the substrate is set from the state of FIG. 9 in the rear housing.

The harness connection terminals 11A to 11D and the connector 9 are conductively connected during a process of assembling the imaging device 1 (FIGS. 9 and 10). The substrate 8 on which the connector 9 is mounted is set in the inner space 12a of the rear housing 6. The substrate 8 is assembled into the rear housing 6 by inserting the plate-shaped contact pieces 11a into the terminal connecting grooves 16b of the movable housing 16 exposed in the recess 8b of the substrate 8 in a state in which a flat surface 8c of the substrate 8, on which the connector 9 is not mounted, is opposed to the partition 13. At this time, to align the terminal connecting grooves 16b with the plate-shaped contact pieces 11a, the substrate 8 may be inserted parallel to the partition 13, or alternatively, may be obliquely inserted from the side of the connector 9. Even when the substrate 8 is thus obliquely inserted, the terminal connecting grooves 16b can be easily aligned with the plate-shaped contact pieces 11a owing to the introducing portions 16c of the projecting portions 16a. Even when the plate-shaped contact pieces 11a and the terminal connecting grooves 16b are not aligned with each other, the movable housing 16 is displaced by the movable pieces 10c of the terminals 10, and this can absorb the misalignment of the fitting positions. Further, when the plate-shaped contact pieces 11a are inserted in the terminal connecting grooves 16b, they can be smoothly held in the clamp contact portions 10e by the curved contact portions 10f formed as the rolled faces. In this way, the connector 9 on the substrate 8 can be easily and conductively connected to the harness connection terminals 11A to 11D. The substrate 8 can be fixed to the rear housing 6 by a mechanical method, such as screwing, or a chemical method using, for example, adhesive.

After the substrate 8 is set in the rear housing 6, the inter-substrate connector 8a and the inter-substrate connector 3c of the base 3b are connected, and further, the front housing 5 is fixed to the rear housing 6. Thus, the imaging device 1 can be obtained.

Operations and Effects of Imaging Device 1

Next, the operations and effects of the imaging device 1 and the components will be described except for the above-described descriptions.

The imaging device 1 has a structure in which the harness connection terminals 11A to 11D have the plate-shaped contact pieces 11a serving as "inner contact portion" and projecting from the inner peripheral surface 12d of the cylindrical peripheral wall 12 to be in conductive contact with the terminals 10 of the connector 9, but does not have a structure in which the harness connection terminals 11A to 11D and the terminals 10 are in press contact with each other in the plate thickness direction of the substrate 8. That is, since the clamp contact portions 10e clamp the plate-shaped contact pieces 11a, the spring force (clamp force) of the clamp contact portions 10e does not act on the substrate 8. Therefore, the imaging device 1 can have high quality without any trouble, for example, without warping the substrate 8 and cracking soldered portions of various electronic components mounted on the substrate 8.

The length of the plate-shaped contact pieces 11a is more than the plate thickness of the substrate 8 in the cylinder axial direction of the cylindrical peripheral wall 12. Therefore, the fixing position of the substrate 8 in the cylinder axial direction (Z-direction) can be adjusted and the degree of flexibility in aligning the optical axis of the image pickup element 3a can be increased.

Modification of Embodiment

Since the above embodiment can be carried out by a modification, the modification will be described.

While the four harness connection terminals 11A to 11D are provided in the embodiment, the number of harness connection terminals may be three or less or five or more.

While the cylindrical pin-shaped contact portions 11b are provided as "outer contact portion" of the harness connection terminals 11A to 11D in the above embodiment, the shape of "outer contact portion" is determined by the relation with the harness component 4, and may be other shapes.

While the bottom edges 11a3 of the plate-shaped contact pieces 11a in the harness connection terminals 11A to 11D are in contact with the partition 13 in the above embodiment, they may be embedded in the partition 13 like the embedded edges 11a2.

While the relay portions 11c of the harness connection terminals 11A to 11D are completely embedded in the partition 13 in the above embodiment, they may be partly exposed on the side facing the inner space 12a of the rear housing 6.

While the substrate 8 is disposed in the rear housing 6 so that the flat surface 8c on which the connector 9 is not mounted is opposed to the partition 13 in the above embodiment, the surface on which the connector 9 is mounted may be disposed to be opposed to the partition 13. Even in this case, since the plate-shaped contact pieces 11a have the length more than the plate thickness of the substrate 8 in the cylinder axial direction of the cylindrical peripheral wall 12, connection can be made without any problem.

What is claimed is:

1. An electronic component comprising:
a housing; and
a terminal fixed to the housing,
the housing including
an external-conductor connecting portion fitting and connecting to an external conductor,
a cylindrical peripheral wall receiving a substrate with a connector mounted thereon, and
a partition provided to close one end of the cylindrical peripheral wall and separating the external-conductor connecting portion and an inside of the cylindrical peripheral wall along a direction intersecting a cylinder axis of the cylindrical peripheral wall, and
the terminal having an outer contact portion disposed in the external-conductor connecting portion to be in conductive contact with the external conductor,
wherein the terminal includes
an inner contact portion projecting from an inner peripheral surface of the cylindrical peripheral wall in the direction to be in conductive contact with a connector terminal of the connector, and
a relay portion embedded tightly in the partition and extending to connect the outer contact portion and the inner contact portion along the direction, and in an end portion of the relay portion on a side of the cylindrical peripheral wall, a bent portion provided to be bent from the partition toward the cylindrical peripheral wall and located between the relay portion and the inner contact portion.

2. The electronic component according to claim 1, wherein the inner contact portion has such a length as to protrude from the partition through a plate thickness of the substrate.

3. The electronic component according to claim 1, wherein the relay portion is formed as a flat conductive piece made of a flat metal piece.

4. The electronic component according to claim 1, wherein the inner contact portion is formed as a plate-shaped contact piece having a plate surface projecting from the inner peripheral surface.

5. The electronic component including the connector according to claim 1, wherein the connector terminal has a clamp contact portion that clamps the inner contact portion in a plate thickness direction.

6. An imaging device comprising the electronic component according to claim 1.

* * * * *